United States Patent [19]

Horlbeck et al.

[11] 4,309,518

[45] Jan. 5, 1982

[54] MOLDING COMPOSITIONS CONTAINING HIGH-MOLECULAR WEIGHT LINEAR POLYESTER

[75] Inventors: Gernot Horlbeck, Haltern; Salih Mumcu, Marl, both of Fed. Rep. of Germany

[73] Assignee: Chemische Werke Huels, Aktiengesellschaft, Marl, Fed. Rep. of Germany

[21] Appl. No.: 172,053

[22] Filed: Jul. 25, 1980

[30] Foreign Application Priority Data

Jul. 26, 1979 [DE]   Fed. Rep. of Germany ....... 2930343

[51] Int. Cl.$^3$ ............................................. C08L 77/12
[52] U.S. Cl. .................................... 525/425; 525/408; 525/927
[58] Field of Search ......................... 525/408, 927, 425

[56] References Cited

U.S. PATENT DOCUMENTS

| | | | |
|---|---|---|---|
| 3,514,498 | 5/1970 | Okazaki | 525/425 |
| 3,632,666 | 1/1972 | Okazaki | 525/425 |
| 3,639,502 | 2/1972 | Okazaki | 525/425 |
| 3,839,245 | 10/1974 | Schlossman | 525/425 |
| 3,946,089 | 3/1976 | Furukawa | 525/408 |
| 4,024,204 | 5/1977 | Schlichting | 525/425 |
| 4,116,925 | 9/1978 | Brachman | 260/42.18 |
| 4,207,410 | 6/1980 | Burzin | 525/288 |
| 4,230,838 | 10/1980 | Fox | 525/408 |
| 4,234,184 | 11/1980 | Deleens | 525/408 |
| 4,238,582 | 12/1980 | Deleens | 525/408 |
| 4,252,920 | 2/1981 | Deleens | 525/408 |

*Primary Examiner*—Paul Lieberman
*Attorney, Agent, or Firm*—Millen & White

[57] ABSTRACT

Molding compositions comprising
A. 60–97% by weight, based on the weight of the total composition, of a poly(alkylene terephthalate) and
B. 3–40% by weight, based on the weight of the total composition, of a polyether ester amide, component A being the condensation product of
 (1) 80–100 molar percent of terephthalic acid, and
 (2) 0–20 molar percent of another hydrocarbonaromatic-,cycloalkane- or alkane-dicarboxylic acid of 6–36 C atoms, with
 (3) 80–100 molar percent of a 1,n-alkanediol of 2–4 C atoms, wherein n is an integer of 2 to 4, and
 (4) 0–20 molar percent of another alkane- or cycloalkane-diol of 3–12 C atoms, component B being the condensation product of
 (1) at least one polyamide-forming ω-aminoalkanecarboxylic acid or alkanelactam, each of 10–17 carbon atoms,
 (2) a poly(alkylene glycol) having a molecular weight of 400 to 6000,
 (3) at least one other alkane-, cycloalkane- or hydrocarbon aromatic dicarboxylic acid of 4–11 carbon atoms, wherein the weight ratio of component B(1) to [B(2)+B(3)] is 20:80 to 98:2, and the hydroxy and carboxy groups in [B(2)+B(3)] are present in amounts approximately equivalent to each other, have unusually superior notch impact strengths.

11 Claims, No Drawings

MOLDING COMPOSITIONS CONTAINING HIGH-MOLECULAR WEIGHT LINEAR POLYESTER

BACKGROUND OF THE INVENTION

The present invention relates to high molecular weight linear polyester-based molding compositions.

Molding compositions based on high-molecular weight linear polyesters, in both reinforced and nonreinforced form, are valuable materials for the manufacture of components having very good mechanical properties. A significant disadvantage is their unsatisfactory notch impact strength whereby their range of application is limited in thin-walled molded article uses and/or in molded articles with corners and edges.

To improve notch impact strength, DOS (German Unexamined Laid-Open Application) No. 2,651,560 discloses copolyesters of terephthalic acid, 1,4-butanediol, and a branched, saturated aliphatic dicarboxylic acid of 7–30 carbon atoms. These copolyesters have a greatly reduced melting point compared with poly(butylene terephthalate).

The same disadvantage of a lowered melting point is exhibited by mixtures of poly(butylene terephthalate) and terephthalic acid/sebacic acid/1,4-butanediol copolyesters (DOS No. 2,707,852).

It is further known from DOS No. 2,331,826 to mix aliphatic polylactones with poly(butylene terephthalate). Since the polylactones have a melting range on the order of about 60° C., they produce molding compositions having restricted applications, especially at elevated temperatures or when used over a relatively long period of time.

To improve the impact strength of linear polyesters, DOS No. 2,622,414 describes the addition of up to 20% by weight of an aromatic polycarbonate, wherein one of the components must be present in pulverized form. Similar measures are known from DOS No. 2,348,377. However, according to the latter, it is difficult to disperse such impact-strength-improving components in the polyester in such a way that homogeneous molded articles can be obtained.

Furthermore, poly(alkylene glycols) having an average molecular weight of 600–6000 have been described as a co-component in, for example, poly(butylene terephthalate) (DOS No. 2,725,709). This feature does not result in any change or improvement of the notch impact strength.

By blending linear polyesters with elastomeric segmented copolyesters of terephthalic acid dialkyl ester, alkanediol, and poly(alkylene glycol), the notch impact strength result in any change or improvement of the notch impact strength.

By blending linear polyesters with elastomeric segmented copolyesters of terephthalic acid dialkyl ester, alkanediol, and poly(alkylene glycol), the notch impact strength of molding compositions can be improved. At the same time, other mechanical properties, such as, for example, the rigidity of molded parts manufactured therefrom are considerably impaired (DOS No. 2,363,512).

The use of polyether ester amides for the production of molded articles having a high cold impact strength is known from DOS No. 2,712,987. This reference, however, does not describe the use of such products as a co-component in linear polyesters. Furthermore, this reference does not suggest that molding compositions manufactured from such blends likewise would have an improved notch impact strength.

SUMMARY OF THE INVENTION

Accordingly, it is an object of the present invention to provide high-molecular weight linear polyesters for production of molding compositions possessing an increased notch impact strength but not exhibiting the above-described disadvantages.

Upon further study of the specification and appended claims, further objects and advantages of this invention will become apparent to those skilled in the art.

These objects have been attained according to this invention by providing molding compositions based on a high-molecular weight linear polyester and a polyether ester amide, wherein the molding compositions comprise A 60–97% by weight, based on the weight of the total composition, of a poly(alkylene terephthalate) and B. 3–40% by weight, based on the weight of the total composition, of a polyether ester amide, wherein component A is produced by condensation of
 (1) 80–100 molar percent of terephthalic acid, and
 (2) 0–20 molar percent of another aromatic, cycloaliphatic or aliphatic dicarboxylic acid, with,
 (3) 80–100 molar percent of a 1,n-alkanediol wherein n is an integer of 2 to 4, and
 (4) 0–20 molar percent of another aliphatic or cycloaliphatic diol, wherein component B is produced by condensation of
 (1) one or more polyamide-forming compounds from the group of the $\omega$-aminocarboxylic acids or lactams each of at least 10 carbon atoms,
 (2) a poly(alkylene glycol) having a molecular weight of 400 to 6000, and
 (3) one or more other aliphatic, cycloaliphatic or aromatic dicarboxylic acids, and wherein the weight ratio of component B(1) to [B(2)+B(3)] is 20:80 to 98:2, and the hydroxy and carboxy groups in [B(2)+B(3)] are present in approximately equivalent amounts.

DETAILED DISCUSSION

Suitable poly(alkylene terephthalates) as component A include poly(ethylene terephthalate), poly(propylene terephthalate) and, preferably, poly(butylene terephthalate). Up to 20 molar percent of the terephthalic acid component, preferably 5–15 molar %, can be replaced by the corresponding residues of other aromatic, cycloaliphatic or aliphatic dicarboxylic acids, generally of 6–36 C atoms, and generally derived from saturated or aromatic hydrocarbons, such as for example, isophthalic acid, phthalic acid, 1,4-cyclohexanedicarboxylic acid, adipic acid, sebacic acid, 1,10-decanedicarboxylic acid, etc.

In place of the aforementioned diols, i.e., 1,n-$C_{2-4}$-alkanediols, it is possible to substitute up to 20 molar percent of the diol content, preferably 5–15 molar percent by other diols, generally of 3–12 C atoms and generally based on saturated hydrocarbons, i.e., alkyls or cycloalkyls, e.g., 1,4- or 1,3-dimethylolcyclohexane, neopentyl glycol, 1,6-hexanediol, 1,5-pentanediol, 1,12-dodecanediol, 1,2-propanediol, etc.

The poly(alkylene terephthalates) are produced according to conventional methods by the interesterification or esterification and polycondensation of terephthalic acid itself, and/or the equivalent polyester-forming derivatives thereof, and diols in the presence of catalysts. (Sorensen and Campbell, Preparative Methods of Polymer Chemistry, Interscience Publishers Inc., N.Y. [1961]: 111-127; "Kunststoff-Handbuch" [Plastics Manual] VIII, C. Hanser Verlag, Munich). The poly(alkylene terephthalates) useful in this invention have a viscosity number of >75 cc/g, e.g., average molecular weight ($\overline{M}_n$) of $\geq$ 12,000.

Suitable polyamide-forming compounds [B(1)] are ω-aminocarboxylic acids and/or lactams, each derived generally from saturated aliphatic hydrocarbons, and each of at least 10 carbon atoms, e.g., 10-17 C atoms, preferably 11 or 12 C atoms, preferably, laurolactam, ω-aminododecanoic acid, or ω-aminoundecanoic acid. Equivalent components which are preferred are, in place of the monomolecular aminocarboxylic acids, the polymers thereof having an average molecular weight ($\overline{M}_n$) of 500-20,000, preferably 4,000-10,000.

Poly(alkylene glycols) as component B(2) include poly(ethylene glycol), poly(propylene glycol), or poly(tetrahydrofuran)diol, each of an average molecular weight in the range of 400 to 6,000, preferably 500-2,500. Poly(tetrahydrofuran)diol is preferred, which compound has an average molecular weight ($\overline{M}_n$) in the range of 500 to 2,500.

The indicated values for all of the average molecular weights are based on viscosity numbers which have been determined.

Component B(3) is an aliphatic, cycloaliphatic or aromatic dicarboxylic acid of 4-11 carbon atoms in the carbon skeleton, and generally derived from saturated or aromatic hydrocarbons. Examples include adipic acid, pimelic acid, suberic acid, azelaic acid, sebacic acid, dodecanedioic acid, hexahydroterephthalic acid, or the phthalic acids. Sebacic acid and dodecanedioic acid are preferred.

The polyether ester amides are structured in such a way that the weight ratio of components B(1) to [B(2)+B(3)] is in the range of 20:80 to 98:2. A weight ratio in the range of 30-75:70-25 is preferred. The hydroxy and carboxy groups of [B(2)+B(3)] are present in approximately equivalent proportions to one another, e.g., in a ratio of 1:0.95 to 1:1.05.

Preferred polyether ester amides are prepared by reacting laurolactam, poly(tetrahydrofuran)diol having an average molecular weight of 650-2,000 and dodecanedioic acid. The average molecular weight ($\overline{M}_n$) of these products is in the range of 5,000 to 20,000, preferably 8,000-15,000.

The production of such polyether ester amides is fully conventional as has been disclosed, for example, in DOS No. 2,712,987, corresponding to U.S. Pat. No. 4,207,410, whose disclosures are incorporated by reference herein.

To prepare the molding compositions of this invention, components A and B are mixed together. For this purpose, for example, granulates of the two products can be remelted at about 265° C. in a twin-screw masticator, homogenized, discharged in rod shape into a water bath and then granulated.

Another possibility for producing the molding compositions of this invention involves adding the polyether ester amide or its individual components to the reaction mixture during the preparation of the polyester. The addition must occur before the onset of the polycondensation reaction. A preferred time of addition is after termination of the interesterification or esterification stage.

During this addition step, the temperature of the reaction mixture should be 170°-230° C., preferably 190°-210° C. This temperature is maintained for about 1-4 hours, preferably 2-3 hours. Subsequently, the polycondensation stage is conducted. After the polycondensation stage, the thus-obtained polyesters can be subjected to a post-condensation in the solid phase.

The molding compositions of this invention consist of 60-97% by weight, preferably 92-70% by weight, of component A and 3-40% by weight, preferably 8-30% by weight, of component B.

Conventional additives and auxiliary agents, such as pigments, dulling agents, processing aids, fillers, thermostabilizers, UV stabilizers, etc., can be incorporated during preparation of the compositions, as well as into the finished molding compositions per se.

Suitable thermostabilizers include phenols or phenol derivatives, preferably sterically hindered phenols having alkyl substituents in both o-positions with respect to the phenolic hydroxy group, as well as amines, preferably secondary aryl amines. These stabilizers are utilized in amounts of 0.1-2% by weight, based on the weight of the finished molding composition. Preferred compounds are 4,4'-bis(2,6-di-tert.-butylphenol), 2,2'-methylenebis(4-methyl-6-tert.-butylphenol) and 4,4'-bis(α,α-dimethylbenzyl)diphenylamine.

Suitable UV stabilizers include substituted benzophenones or benzotriazoles.

A myriad of molded articles, including, for example, technical and industrial apparatus parts, conduit sheathings, profiles, electrical insulations, etc. can be produced from the molding compositions of this invention in accordance with fully conventional shaping methods (e.g., injection molding, extrusion, etc.).

The viscosity numbers of the poly(alkylene terephthalate) as well as of the poly(alkylene terephthalate) modified with the polyether ester amide were determined on solutions of 0.23 g of product at 25° C. in 100 ml of phenol/1,1,2,2-tetrachloroethane (weight ratio 60:40).

The viscosity numbers of the polyether ester amides were determined on solutions of 0.5 g of product at 25° C. in 100 ml of m-cresol (DIN 53 727 [=determination of viscosity number of polyamides in dilute solution] [German Industrial Standard]).

The melting ranges were determined by means of the differential thermal calorimetry (DSC) method.

The torsional vibration measurements were conducted on press-molded plates produced at 240° C. under a pressure of 44 bar. The measuring frequency was 1 Hz. According to this method, the torsional modulus was determined in dependence on the temperature, and the glass transition temperature was determined as well.

To find the notch impact strength (DIN No. 53 453 [=impact test]), the critical bending stress (DIN 53 452 [=testing of plastics, bending test]) and the modulus of elasticity (DIN 53 457, paragraph 2.3), small-size standard rods and drawn rods were produced using a screw-type injection molding machine at a cylinder temperature of 230°-250° C. and a molding temperature of 60° C.

EXAMPLE 1A (Not According to This Invention)

9.7 kg of dimethyl terephthalate, 9.0 kg of 1,4-butanediol and 36 g of 10% titanium tetraisopropylate solution in isopropanol are reacted in accordance with the conditions described below for Examples 5 through 7.

EXAMPLES 1-4

9.7 kg of dimethyl terephthalate, 9.0 kg of 1,4-butanediol, and 36 g of 10% titanium tetraisopropylate solution in isopropanol are melted in a polycondensation reactor and interesterified in a nitrogen stream at 180°-200° C. until the stoichiometric quantity of methanol has been distilled off from the reaction mixture. Then, the amount of polyether ester amide indicated in percent by weight in Table 1 is added at 200° C., and the mixture is agitated for two hours. At this temperature a water-jet vacuum is applied for a period of 1.5 hours. Then, the reaction mixture is heated to 250° C. while distilling off excess 1,4-butanediol. The pressure is reduced to less than 0.5 mbar; under these conditions the batch is polycondensed within one hour.

After removing the vacuum with nitrogen, the batch is discharged from the reaction vessel by way of a viscose pump, cooled in water, and granulated.

In these examples, the polyether ester amide employed is obtained in accordance with DOS No. 2,712,987. This product was produced by polycondensation of laurolactam [B(1)], dodecanedioic acid and poly(tetrahydrofuran)diol with an average molecular weight of 1,000 [B(2)+B(3)], wherein the weight ratio of B(1):[B(2)+B(3)]=75:25. The viscosity number of the polycondensate was 1.34 cc/g; its melting point was 170° C.

TABLE 1

| Example | Amount of Polyether Ester Amide Added (Parts by Weight)/ 100 Parts of Poly-(butene terephthalate) | Viscosity Number [cc/g] | M.P. [°C.] | Notch Impact Strength (DIN 53453 23° C.) [mJ/mm$^2$] | $T_g$ [°C.] | Shear Modulus G' (+ 20° C.) [N/mm$^2$] |
|---|---|---|---|---|---|---|
| 1 | 8.3 | 86 | 228 | 3.5 | 42 | 9 × 10$^2$ |
| 2 | 15.4 | 76 | 226 | 5.2 | 34 | 7.8 × 10$^2$ |
| 3 | 21.4 | 88 | 224 | 6.0 | 23 | 6.6 × 10$^2$ |
| 4 | 26.7 | 84 | 215 | 8.4 | 15 | 5.3 × 10$^2$ |
| 1A | — | 90 | 228 | 2.7 | 47 | 1 × 10$^3$ |

EXAMPLES 5-7

9.7 kg of dimethyl terephthalate, 9.0 kg of 1,4-butanediol and 36 g of 10% titanium tetraisopropylate solution in isopropanol are melted until the stoichiometric amount of methanol has been distilled off from the reaction mixture. Then the amounts of polyamide 12, dodecanedioic acid, and poly(tetrahydrofuran)diol ($\overline{M}_n = 1,000$) indicated in percent by weight in Table 2 are added. The mixture is stirred for 2 hours at 200° C.

Then, a water-jet vacuum is applied within 30 minutes and the reaction mixture is heated within two hours to 250° C. After the pressure has been reduced to less than 0.5 mbar, the batch is polycondensed under these conditions within 1.5 hours.

The vacuum is eliminated with nitrogen and the batch is discharged in the usual way.

TABLE 2

| Example | Amount Added (Parts by Weight)/100 Parts by Weight of Poly-(butene terephthalate) | | Viscosity Number [cc/g] | M.P. [°C.] | Notch Impact Strength (DIN 53453 23° C.) [mJ/mm$^2$] | $T_g$ [°C.] | Shear Modulus G' (+20° C.) [N/mm$^2$] |
|---|---|---|---|---|---|---|---|
| 5 | 6.65 | PA 12 (*) | 97 | 217 | 6.5 | 18 | 5.5 × 10$^2$ |
|   | 1.25 | DDA (*) | | | | | |
|   | 5.4 | PTHF (*) | | | | | |
| 6 | 11.8 | PA 12 | 103 | 210 | 22 | 8 | 4.1 × 10$^2$ |
|   | 2.2 | DDA | | | | | |
|   | 9.6 | PTHF | | | | | |
| 7 | 5.9 | PA 12 | 112 | 211 | no breaking | 0 | 3.5 × 10$^2$ |
|   | 3.3 | DDA | | | | | |
|   | 14.4 | PTHF | | | | | |
| 1A | — | | 90 | 228 | 2.7 | 47 | 1 × 10$^3$ |

(*)
PA 12: Polyamide 12 (average molecular weight 10,000)
DDA: Dodecanedioic acid
PTHF: Poly(tetrahydrofuran)diol (average molecular weight 1,000)

EXAMPLES 8-10

Granulated polyether ester amide is mixed in the indicated proportion with granulated poly(butene terephthalate), melted at 260°-270° C. in a twin-screw masticator, homogenized, discharged in rod form into a water bath and granulated.

The polyether ester amide was produced according to DOS No. 2,712,987. It was obtained by polycondensation of laurolactam [B(1)], dodecanedioic acid, and poly(tetrahydrofuran)diol having an average molecular weight of 1,000 [B(2)+B(3)], the weight ratio being B(1):[B(2)+B(3)]= 1:1. The viscosity number of the polycondensate was 1.89 cc/g, the melting range was 149°-155° C.

The polyester employed was a commercial product ("VESTODUR" B—viscosity number: 110 cc/g).

TABLE 3

| Example | Amount of Polyether Ester Amide Added (Parts by Weight)/ 100 Parts of Poly(butene terephthalate) | Modulus of Elasticity (Tension) (DIN 53457) [N/mm²] | Notch Impact Strength (DIN 53453 23° C.) [mJ/mm²] | Critical Bending Stress (DIN 53452) [N/mm²] |
| --- | --- | --- | --- | --- |
| 8 | 11.1 | 2,300 | 6.4 | 83 |
| 9 | 17.6 | 2,300 | 6.9 | 73 |
| 10 | 25.0 | 2,200 | 12.2 | 70 |
| 1A | — | 2,200 | 2.7 | 96 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A molding composition comprising
   A. 60–97% by weight, based on the weight of the total composition, of a poly(alkylene terephthalate) and
   B. 3–40% by weight, based on the weight of the total composition, of a polyether ester amide,
   the amount of component B being effective to increase the notch impact strength of the composition with respect to that of component A per se,
   component A being the condensation product of
   (1) 80–100 molar percent of terephthalic acid, and
   (2) 0–20 molar percent of another hydrocarbon aromatic-, cycloalkane- or alkane-dicarboxylic acid of 6–36 C atoms, with
   (3) 80–100 molar percent of a 1,n-alkanediol of 2–4C atoms, wherein n is an integer of 2 to 4, and
   (4) 0–20 molar percent of another alkane- or cycloalkane-diol of 3–12 C atoms,
   component B being the condensation product of
   (1) at least one polyamide-forming ω-aminoalkanecarboxylic acid or alkanelactam, each of 10–17 carbon atoms,
   (2) a poly(alkylene glycol) having a molecular weight of 400 to 6000,
   (3) at least one other alkane-, cycloalkane- or hydrocarbon aromatic-dicarboxylic acid of 4–11 carbon atoms,
   wherein the weight ratio of component B(1) to [B(2)+B(3)] is 20:80 to 98:2, and the hydroxy and carboxy groups in [B(2)+B(3)] are present in amounts of approximately equivalent to each other.

2. The molding composition of claim 1, comprising 92–70% by weight of component A and 8–30% by weight of component B.

3. The molding composition of claim 1, wherein component B(1) is laurolactam, ω-aminododecanoic acid or ω-aminoundecanoic acid.

4. The molding composition of claim 1, wherein component B(1) is a polymer of an ω-aminoalkanecarboxylic acid of an average molecular weight of 500–20,000.

5. The molding composition of claim 1, wherein component B(2) is poly(tetrahydrofuran)diol.

6. The molding composition of claim 1 wherein component B(3) is sebacic acid or dodecanedioic acid.

7. The molding composition of claim 1, wherein the weight ratio of B(1) to [B(2)+B(3)] is 30–75:70–25.

8. The molding composition of claim 1, wherein the equivalents ratio of the number of OH groups to COOH groups in components B(2) and B(3) is 1:0.95 to 1:1.05.

9. The molding composition of claim 1, wherein component B(1) is laurolactam, B(2) is poly(tetrahydrofuran)diol of average molecular weight of 650–2000 and B(3) is dodecanedioic acid.

10. The molding composition of claim 1, having an average molecular weight of 5000 to 20,000.

11. A method of increasing the notch impact strength of a molding composition comprising a poly(alkylene terephthalate) which is a condensation product of
   (1) 80–100 molar percent of terephthalic acid, and
   (2) 0–20 molar percent of another hydrocarbon aromatic-, cycloalkane- or alkane-dicarboxylic acid of 6–36 atoms,
   (3) 80–100 molar percent of 1,n-alkanediol of 2–4 C atoms, wherein n is an integer of 2 to 4, and
   (4) 0–20 molar percent of another alkane- or cycloalkane-diol of 3–12 C atoms,
   comprising including in the composition an amount, in the range of 3–40%, effective to increase notch impact strength, of a polyether ester amide which is a condensation product of
   (1) at least one polyamide-forming ω-aminoalkanecarboxylic acid or alkanelactam, each of 10–17 carbon atoms,
   (2) a poly(alkylene glycol) having a molecular weight of 400 to 6000,
   (3) at least one other alkane-, cycloalkane- or hydrocarbon aromatic dicarboxylic acid of 4–11 carbon atoms,
   wherein the weight ratio of component B(1) to [B(2)+B(3)] is 20:80 to 98:2, and the hydroxy and carboxy groups in [B(2)+B(3)] are present in amounts approximately equivalent to each other.

* * * * *